United States Patent [19]

Gulick et al.

[11] 4,065,771
[45] Dec. 27, 1977

[54] RANDOM SCANNING RECEIVER

[75] Inventors: Joseph F. Gulick, Clarksville; Donald R. Marlow, Highland, both of Md.

[73] Assignee: The United States of America as represented by the Secretary of the Navy, Washington, D.C.

[21] Appl. No.: 723,258

[22] Filed: Sept. 14, 1976

[51] Int. Cl.$^2$ .......................... H01Q 3/26; G01S 3/42
[52] U.S. Cl. .......................... 343/100 SA; 343/113 R; 343/117 R; 343/854
[58] Field of Search ........ 343/16 LS, 100 SA, 117 A, 343/117 R, 118, 113 R, 854

[56] References Cited

U.S. PATENT DOCUMENTS

| | | | |
|---|---|---|---|
| 2,929,058 | 3/1960 | Blasberg et al. | 343/16 LS |
| 3,419,868 | 12/1968 | Clayton, Jr. | 343/16 LS |

*Primary Examiner*—Maynard R. Wilbur
*Assistant Examiner*—Richard E. Berger
*Attorney, Agent, or Firm*—R. S. Sciascia; A. L. Branning

[57] ABSTRACT

The present invention relates to an array antenna radar receiver for tracking a signal source wherein selected phase-delay patterns of array elements are randomly selected to produce a random scan which is effectively interference free.

6 Claims, 1 Drawing Figure

RANDOM SCANNING RECEIVER

BACKGROUND OF THE INVENTION

A conical scan (conscan) receiver in its simplest form is a mechanical apparatus that nutates the main lobe of a radar beam about an axis normal to the plane of the antenna. The beam is usually tilted off the axis approximately one-half the 3 db beamwidth. Information indicating the direction of a signal with respect to the axis of the antenna is contained in the amplitude modulated portion of received signals and in the phase relation between the received signal modulation and a reference generated by a device attached to the nutator. This simple form of conscan receiver has been found useful in both missile and radar systems since only a single channel is required to process the received signals.

In recent years, the mechanical nutator and parabolic dish have been replaced by an electronic scanner, wherein the outputs from each element of the array are delayed sinusoidally in ferrite phase shifters. A continuously scanning beam like that of the mechanical conscan receiver, except without the inertia losses inherent in the mechanical system, was thereby obtainable.

With advances in electronic countermeasure technology, the generating of power modulation signals by external sources which could interfere with the received signals came into use. Interference having the same or nearly the same regularity or frequency as the signal modulation frequency could be generated to cause confusion and unreliability in received information.

In an attempt to overcome this regularity problem, a conscan system which changes the rate of beam nutation, or scan, pseudorandomly was developed as disclosed in U.S. Pat. No. 3,859,658. False antenna pointing errors caused by incidental or deliberate amplitude modulation interference at the constant scan frequency of the energy received from the source being tracked were diminished. However, the technique taught by the reference was still susceptible to undesirable interference. This susceptibility can be understood by considering the frequency spectrum over which information is being received. In the use of a radar at a single scan speed the information is carried on one frequency which is easily monitored and interfered with. The pseudorandom varying of scan rate spreads the information over a set bandwidth which, though more difficult, can be subjected to interference. Thus, although an improvement over the prior art, the pseudorandom scan rate was also found to be deficient.

Further, the requirement of fast AGC in prior art receivers has often caused a phase shift in the modulation envelopes of received signals, resulting in crosscoupling between azimuth and elevation error signals. Such crosscoupling has led to erroneous angle information which has seriously degraded the performance of such systems.

SUMMARY OF THE INVENTION

The present invention overcomes all of the aforementioned disadvantages by providing an array receiver antenna having elements which are randomly controlled to receive position information from signal sources.

Because the array elements and thus the main lobe positions associated therewith are controlled randomly, there is no scan rate which can be monitored or interfered with. This is because information is spread over the maximum possible bandwidth. In order to interfere with the received signal of the present invention, the interference would have to span the entire frequency spectrum (from d.c. to the clock frequency) rather than just a portion, or set bandwidth, of it as with the aforementioned pseudorandom scan rate system. The spreading of information across the spectrum makes it virtually impossible to generate a modulation pattern which could confuse the receiver of the present invention.

Another advantage of the invention is that signals received at the array elements are selectively delayed in predetermined patterns with simulate a tilting of the antenna to different main lobe positions with respect to a signal source. Signals received at the array elements are combined to form a sum signal each time the main lobe position changes. Comparing the sum signals associated with the differing main lobe positions provides information used in generating error signal outputs. The error signal outputs are, in turn, used to move the antenna array so as to decrease the error signals and thus track the signal source.

As a further advantage, the present random scanning receiver provides an AGC feedback circuit which frees the receiver from unwanted signal modulations. Such unwanted modulations are received at the input together with information-carrying beam scanning signal modulations which result from main lobe beam position switching. The AGC circuit compares the sum signal with a reconstructed, or remodulated, signal formed by appropriately switching and filtering the error signal outputs. The sum signal consists of main lobe beam switching modulations as well as input signal variations whereas the remodulated signal consists of main lobe beam switching modulations only. Comparing the two signals yields a control signal which is used to make the output signal level essentially independent of unwanted input signal variations.

Still further, the present random scanning receiver employs digital coding amenable to pulse and cw radar systems.

The present invention is a simple and adaptable radar receiver which is reliable even in environments strewn with interfering sources.

Finally, the present invention provides a receiver which can evaluate information relating to the position of a signal source at a sampling rate limited by only the application and associated response time of the system. Where the system responds slowly as in ground radar systems, the sample rate can be slow. In a missile steering application, where fast system responses are required, the receiver can increase the rate of information evaluation. Regardless of application, the principles of the present invention as claimed pertain.

DESCRIPTION OF THE PREFERRED EMBODIMENT

Figure 1:
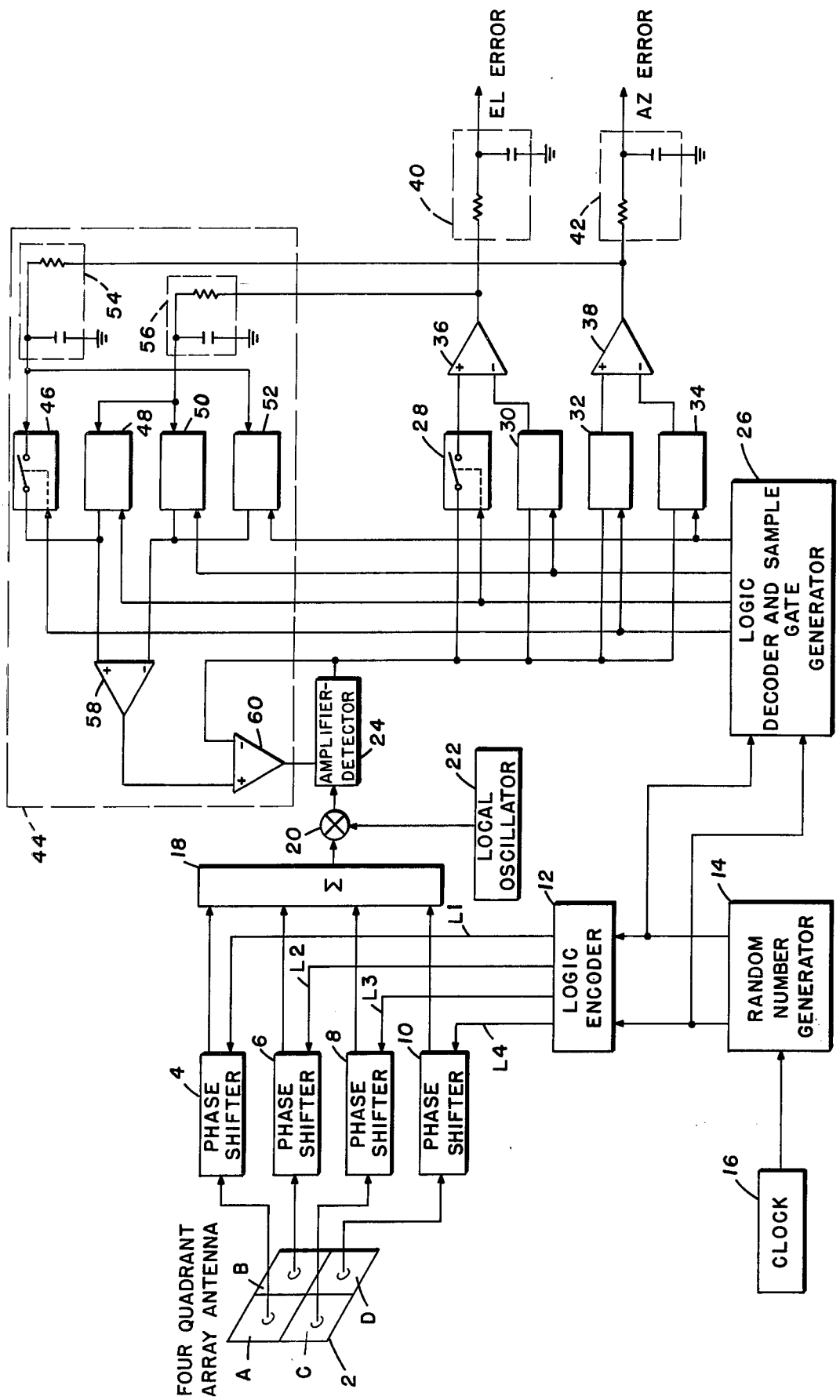
FIG. 1 shows a block diagram of the present invention.

In FIG. 1, a receiver antenna 2 is shown, by way of example, comprised of an array of four elements A, B, C, and D which receive radar signals from a signal source (not shown). Connected to each array element A, B, C, and D is a phase shifter 4, 6, 8, and 10, respectively, which can be of the ferrite type. The phase shifters 4, 6, 8, and 10 can delay or advance the phase of signals received at the respective element A, B, C, or D. The delaying or advancing of phase is determined by inputs to the phase shifters 4, 6, 8, and 10 from a logic encoder 12; the inputs, in the preferred embodiment, being lines L1, L2, L3, and L4, respectively, which carry a high level of d.c. current to effect a delay or a low level of d.c. current to effect an advance in each phase shifter 4, 6, 8, and 10. The logic encoder 12 is designed, in this embodiment, to produce one of four patterns of paired element delays wherein two phase shifters are delayed while the other two are advanced relatively. For example, the output from logic encoder 12 might cause delays in phase shifters 4 and 6 (with high level d.c. currents on lines L1 and L2) while advancing phase shifters 8 and 10 (with low level d.c. currents on lines L3 and L4).

An examination of well-known, conventional phased array antenna operation shows that a phase delay on one side of an antenna relative to the other side will have the effect of shifting the main lobe of the antenna pattern toward the delayed elements. In the example, then, the relative delay of phase shifters 4 and 6 would have the effect of tilting the main lobe upward. Conversely, delaying phase shifters 8 and 10 relative to phase shifters 4 and 6 would have the effect of tilting the main lobe down. And, similarly, delaying phase shifters 6 and 10 (4 and 8) with respect to the other phase shifter pair would have the effect of a tilting left (right).

Which pair of phase shifters is delayed, i.e. which output lines L1 through L4 are high, is determined by the output of a random number generator 14 which produces a random two-bit output on every clock pulse generated by a controllable clock 16. The binary output from the random number generator 14 enters the logic encoder 12 where the random two-bit output is encoded to produce a corresponding set of paired element delays on lines L1 through L4.

Signals from array elements A, B, C, and D are appropriately delayed in phase shifters 4, 6, 8, and 10 and are then vectorially summed in a summing stage 18. A signal originating normal to, or directly in front of, the plane of the antenna 2 will have a fixed amplitude no matter how the main lobe is, in effect, tilted. This, however, is not the case should the signal source (not shown) be at an angle off the normal. The vector sum signal generated in summing stage 18 will be a function of which phase shifter pair is delayed, i.e. how the main lobe is tilted, and the angular distance the signal source is from the normal.

The vector sum signal enters a mixer 20 together with a signal from a local oscillator 22, the mixed output being then entered into an amplifier-detector stage 24 as is conventional in superheterodyne receivers. The output from the amplifier-detector stage 24 is correlated to a particular main lobe position by means of a logic decoder and gate generator 26. That is, in response to the generating of a particular random number, the logic decoder and gate generator 26 selectively energizes one of the correlation switches 28, 30, 32, or 34 which, it should be noted, correspond to up, down, left, and right main lobe positions, respectively. Error signal outputs are generated by entering the outputs from switches 28, 30, 32, and 34 into comparators 36 and 38 and continually averaging the compared outputs in filters 40 and 42, respectively. The comparators 36 and 38, in the present embodiment, put out azimuth and elevation pointing error signals which are used to move antenna 2 so that the signal source (not shown) ends up on the normal to antenna 2.

In addition to correlating the main lobe position with the received signal magnitude, the logic decoder and gate generator 26 also provides input to an automatic gain control (AGC) circuit 44 which eliminates signal amplitude variations received at the input to the array antenna 2. The automatic gain controlling is accomplished by simply remodulating the error signals through remodulating switches 46, 48, 50, and 52 to reproduce the same main lobe beam switching modulation as that produced at the output of the amplifier-detector 24, expect that the remodulated signal is filtered through synchronously tuned bandpass filters 54 and 56. The bandwidths of bandpass filters 54 and 56 are determined by their respective filter time constants. (with appropriate time constants, it should be noted, filters 40 and 42 which provide error signal output can also serve, by making apparent circuit wiring modifications, the dual function of bandpass filtering, thereby replacing filters 54 and 56). The signals exitting remodulating switches 46, 48, 50, and 52 are selectively compared in amplifier 58. The remodulated signal from amplifier 58, unlike the output from amplifier-detector 24, contains no modulation frequencies other than those associated with main lobe beam switching. Thus, comparing the remodulated signal with the output from amplifier-detector 24 in AGC amplifier 60 produces a control signal which can be used to limit the level of all signal components passed through amplifier-detector 24 at frequencies other than the main lobe beam switching frequency. The rate at which the AGC system 44 responds to changing target positions depends on the time constants of the filters 54 and 56.

Table I below shows the interrelationship between the generated random number, main lobe position, correlation switching, and AGC remodulation switching.

Table I

| Random Number Two Bit Output | Direction of Main Lobe Tilt | Paired Elements Delayed | Paired Elements Advanced | Correlation Switch Energized | Remodulation Switch Energized |
|---|---|---|---|---|---|
| φ1 | Up | AB | CD | 28 | 48 |
| 1φ | Left | BD | AC | 32 | 46 |
| 11 | Down | CD | AB | 30 | 50 |
| φφ | Right | AC | BD | 34 | 52 |

From Table I it can be seen that when φφ is generated, the main lobe of the array antenna 2 is effectively tilted right; correlation switch 34 is energized as is with remodulation switch 52. An azimuth pointing error signal is produced which is used to move the array antenna 2 in a manner so as to reduce both the azimuth and elevation pointing errors and thereby effect a tracking of the signal source (not shown). The azimuth error signal is remodulated through remodulating switch 52 after passing through bandpass filter 54. A remodulated signal is produced which is compared to the signal from amplifier-detector 24, the output from which re-enters amplifer-detector 24 to eliminate the effect of input signal level variations on the output from amplifier-detector 24.

The tracking of a signal source is thus achievable regardless of input signal variations and signal interference.

It should, of course, be understood that the abovedescribed four-element array may be increased to any size array by simply changing the coding implemented by the logic encoder 12 and the logic decoder and sample gate generator 26. Further, changing the coding correlations between the random numbers and selected phase shifters 4, 6, 8, and 10 and switch circuits 28, 30, 32, and 34 is within the scope of the invention. Still further, it should be realized that elements other then simple RC elements shown in FIG. 1 might be used for averaging and the phase-shifting might be effected by other than ferrite-type shifters since linear phase shift is not required. And still further, it should be understood that different correlation patterns between delayed elements other than pairwise element delays are also within the scope of the invention as hereafter claimed. And, still further, the output error signals need not be limited to azimuth and elevation error signals but may as well be adapted to antenna systems requiring more than two output error signals to adjust antenna position.

Various other modifications, adaptations and alterations are of course possible in light of the above teachings. It should therefore be understood that within the scope of the appended claims the invention may be practiced otherwise than as was specifically described.

What is claimed is:

1. An array antenna receiver for tracking a signal source, comprised of:
   means for detecting and amplifying the sum of signals received by all elements of the array, where each sum of signals corresponds to a pattern of array elements randomly selected to be phase-delayed with respect to the other elements,
   means, having the detected and amplified sum of signals as an input, for generating an azimuth error signal and an elevation error signal, and
   automatic gain control (AGC) feedback means, connected from the azimuth and the elevation error signals generating means output to provide an input to the amplifier-detector means, for controlling the level of signal produced by the amplifier-detector means by eliminating unwanted input signal variations.

2. An array antenna receiver for tracking a signal source, as in claim 1, wherein the AGC feedback means comprises:
   a plurality of remodulating switches for converting the error signal outputs into a remodulated signal,
   means for receiving as inputs and comparing each sum of signals, which has a main lobe switching signal component as well as in input signal variation signal component, with a remodulated signal, which has only a main lobe switching signal component that is the same as that of the sum of signals, thereby yielding the input signal variation signal component as its output, and
   means, connected to receive and compare the outputs from the amplifier-detector means and the sum of signals comparing means, for producing a control signal from the input signal variation signal component, the control signal being fed back into the amplifier-detector means, making the azimuth and the elevation error signal outputs independent of input signal variations.

3. An array antenna receiver for tracking a signal source, as in claim 1, further comprising:
   a random number generator,
   a logic encoder, connected to the random number generator, which produces an output which determines a phase-delay array pattern which corresponds to the random number generated, and
   logic decoder and sample gate generator means, connected to the random number generator, for coordinating the input to the azimuth and the elevation error signal generating means with the phase-delay pattern determined by the logic encoder and for coordinating the input to the AGC feedback means with the phase-delay pattern determined by the logic encoder.

4. An array antenna receiver for tracking a signal source, as in claim 3, wherein the AGC feedback means further comprises:
   bandpass filters separately connected to receive the azimuth error signal and to receive the elevation error signal,
   a first comparator, and
   remodulating switch means, connected between the bandpass filters and the first comparator, for passing the filtered signals corresponding to the positive elevation and positive azimuth into the positive input of the first comparator and for passing the filtered signals corresponding to the negative elevation and negative azimuth into the negative input of the first comparator,
   wherein the signal passing switching means is energized in response to the logic decoder and sample gate generator which provides a gating input.

5. An array antenna receiver for tracking a signal source, as in claim 4, wherein the AGC feedback means further comprises;
   a second comparator for receiving as inputs and comparing the remodulated output of the first comparator with the sum of signals from the amplifier-detector means and
   means, connected to receive and compare the outputs from the amplifier-detector means and the sum of signals comparing means, for producing a control signal from the input signal variation signal component, the control signal being fed back into the amplifier-detector means, making the azimuth and the elevation error signal outputs independent of input signal variations.

6. An array antenna receiver for tracking a signal source as in claim 5, further comprising:
   means, connected to the random number generator, for phase delaying signals received by a predetermined pattern of array elements, the pattern corresponding to and being generated in accordance with the number output from the number generating means, and
   means, connected to receive the signals from both the phase-delayed and non-delayed elements, for summing signal magnitudes from the delayed and non-delayed signals of the array elements, and
   means for inputting and correlating the magnitudes of different sums of signals with the signal source position,
   wherein the correlating means comprises:
      a plurality of correlation switches which receive sums of signals as inputs,
      decoder-and-sample gate means for selectively enabling a correlation switch in response to the inputting of one of the randomly generated numbers,
      means for selectively comparing, over time, the sum of signals exitting each correlation switch, and
      means for averaging the output from the sum of signals comparing means, thereby producing an azimuth error signal and an elevation error signal.

* * * * *